United States Patent
Tomilchenko et al.

(10) Patent No.: US 11,845,015 B2
(45) Date of Patent: Dec. 19, 2023

(54) SYSTEM FOR CO-POSITIONING OF PHYSICAL AND VIRTUAL OBJECTS

(71) Applicants: Kostyantyn Ivanovych Tomilchenko, Kyiv (UA); Ievgen Volodymyrovych Gusarov, Zaporizhia (UA); Iurii Oleksandrovych Kostenko, Kyiv (UA)

(72) Inventors: Kostyantyn Ivanovych Tomilchenko, Kyiv (UA); Ievgen Volodymyrovych Gusarov, Zaporizhia (UA); Iurii Oleksandrovych Kostenko, Kyiv (UA)

( * ) Notice: Subject to any disclaimer, the term of this patent is extended or adjusted under 35 U.S.C. 154(b) by 361 days.

(21) Appl. No.: 17/421,561

(22) PCT Filed: Nov. 6, 2019

(86) PCT No.: PCT/UA2019/000138
§ 371 (c)(1),
(2) Date: Jul. 8, 2021

(87) PCT Pub. No.: WO2020/122851
PCT Pub. Date: Jun. 18, 2020

(65) Prior Publication Data
US 2022/0080332 A1   Mar. 17, 2022

(30) Foreign Application Priority Data
Dec. 11, 2018  (UA) .................. u 2018 12324

(51) Int. Cl.
| | | |
|---|---|---|
| *A63J 5/02* | (2006.01) |
| *B25J 11/00* | (2006.01) |
| *G03B 21/14* | (2006.01) |
| *G03B 21/62* | (2014.01) |
| *H04N 5/222* | (2006.01) |

(52) U.S. Cl.
CPC ............. *A63J 5/021* (2013.01); *B25J 11/003* (2013.01); *G03B 21/145* (2013.01); *G03B 21/62* (2013.01); *H04N 5/222* (2013.01)

(58) Field of Classification Search
CPC . A63J 5/00; A63J 5/021; B25J 11/003; G03B 21/62; G03B 21/145; H04N 5/222
USPC ............................... 472/60–61, 130
See application file for complete search history.

(56) References Cited

U.S. PATENT DOCUMENTS

| | | |
|---|---|---|
| 5,046,022 A | 9/1991 | Conway et al. |
| 2010/0140046 A1 | 6/2010 | Flessas |
| 2013/0120547 A1 | 5/2013 | Linnell |
| 2018/0084224 A1 | 3/2018 | McNelley et al. |
| 2019/0025578 A1* | 1/2019 | Boffi .................. G02B 27/0101 |
| 2021/0084116 A1* | 3/2021 | Rajagopalan ....... H04L 67/1014 |

FOREIGN PATENT DOCUMENTS

| | | |
|---|---|---|
| CN | 204188940 U | 3/2015 |
| SE | 500576 C2 | 7/1994 |

* cited by examiner

*Primary Examiner* — Kien T Nguyen
(74) *Attorney, Agent, or Firm* — Nadya Reingand

(57) ABSTRACT

A system for co-positioning physical and virtual objects during stage performances when the movements of the object (3) on the stage (1) are combined with the projected image. The technical result to be achieved is in the enhancement of functionalities of the system due to the increase in the accuracy of movement of the object (3), the increase in speed and degrees of freedom of the object (3) movement providing simultaneous synchronized co-positioning of physical and virtual objects (3).

6 Claims, 3 Drawing Sheets

SYSTEM FOR CO-POSITIONING OF PHYSICAL AND VIRTUAL OBJECTS

The claimed utility model relates to robotics, which is used during demonstration events, stage performances, and other public displays during which the movement of the object on the stage is combined with the projected image.

The state of the art indicates the existence of means for positioning physical objects during the performance, consisting of the creation of systems of cables, blocks and loads, through which the physical object moves. Such a system has a low accuracy of positioning.

In the prior art there's well-known hoisting equipment for raising and lowering theatrical scenery as described in patent SE500576 C2, according to which such equipment is an engine or rotary manual drive placed over the scenery. On the shaft side, there are at least two drums with their axes placed parallel to the shaft axis. The transmission drive is located between the shaft and the drum. The cables are reeled onto the drum, one of their ends is attached to the beam supporting the scenery to be raised or lowered. The known solution allows the object to be positioned in a single plane with low accuracy, has high inertia and low degrees of freedom.

The claimed technical solution is based on creating a system that synchronizes the co-positioning of physical and virtual objects, which are reproduced during stage performances; this eliminates the drawbacks of existing solutions in the prior art.

The task can be solved thanks to the fact that the system for co-positioning physical and virtual objects during the stage performances comprises
- a stage,
- a projection mesh screen,
- a projection device,
according to the technical solution, it comprises
- a control unit,
- a robot manipulator having a base and at least one arm divided into sections where the sections are pivotally connected with each other, wherein the robot manipulator is coupled to the control unit and is configured to make the arm movements in six axes within an accuracy of up to 0.01 mm, a rotation range±450° in a single plane and at a speed from 0 to 2000°/sec.,
- a harness attached to the robot manipulator's arm,
- a controlled stage lighting device connected to the control unit,
- wherein the projection mesh screen is located along the stage and configured to divide the stage into the front part which is closer to spectators and rear part, which is separated from the spectators by the projection mesh screen,
- where the projection mesh screen is made of the material partially reflecting the luminous flux projected onto it,
- the projection device is coupled to the control unit and configured to project the luminous flux onto the projection mesh screen,
- wherein the control unit is configured to transmit control signals for the synchronization of the luminous flux change through the projection device with the movements of the robot manipulator, harness.

In accordance with one embodiment, the robot manipulator is configured to be stationary installed on the stage by fixing its base on the stage.

In accordance with another embodiment, the robot manipulator is configured to move around the stage through the installation of its base on the rails.

In accordance with yet another embodiment, the robot manipulator is configured to be placed on the stage through the installation of its base on the support which can be moved.

In accordance with another embodiment, the system has the acoustic system connected to the control unit.

In accordance with still another embodiment, the control unit is configured to set the mode of operation of the controlled stage lighting device of the UV band and/or visible light.

The system achieves a technical result of enhancing the functionalities of the operation due to the increase in the accuracy of movement and positioning of the object, the increase in speed and the degrees of freedom of the object's movement with simultaneous synchronized combination of such movement or positioning with the projected image and/or sound accompaniment.

The point of the claimed system is explained by appended drawings schematically depicting the placement of the system components relative to the stage. Based on this description, the person skilled in the art shall understand that the system components may have a different placement. That is to say, the embodiments shown in the drawings do not limit the performance of the claimed system to the above-mentioned correlative placements only. Other embodiments of correlative placement are permitted if they allow the task to be solved and ensure the achievement of the claimed technical result.

The following references are used on the accompanying drawings:
- 1—stage
- 2—robot manipulator
- 3—object
- 4—control unit
- 5—projection mesh screen
- 6—acoustic system
- 7—projection device
- 8—controlled stage lighting device
- 9—base for stationary mounting on the stage
- 10—rails
- 11—support for installation on the stage.

The following detailed description of the claimed technical solution is presented along with an explanation of properties that are both new and unexpected in the art that had been found during the implementation of the claimed system. The detailed description is explanatory and does not limit the essence of the claimed solution. From the provided detailed description, a person skilled in the art should understand the obvious upgrades and improvements of the system.

The system for co-positioning physical and virtual objects during stage performances is used primarily indoors, particularly in areas with controlled lighting. The use of the system outdoors is possible mainly at night-time.

The stage in this description means a flat level surface separated from the spectators' seats. The projection mesh screen and robot manipulator are installed on the stage. It is also preferable to place the controlled stage lighting device behind the projection mesh screen in relation to the spectator, where such a stage lighting device reproduces the waves of the visible and/or ultraviolet band. The said controlled stage lighting device has at least one lamp of ultraviolet band with the wavelength of 320-400 nm and/or at least one lamp of visible band and lighting equipment that distributes the light of at least one lamp. It is allowed to change the wavelength of the visible band being emitted by at least one lamp of visible band due to the presence of a relevant set of light filters or other hardware or software configurations. The controlled stage lighting device incorporates the control system for brightness and position and is operated by the control unit. The controlled stage lighting device is connected to the control unit.

The installation of certain stage sets is already known in the art. However, such installation does not provide for the availability of technical means for fixing the sets on the stage. At the same time, the stage under the claimed technical solution is used for a new purpose, namely the mounting of the robot manipulator. Such purpose becomes conceivable given the availability of the appropriate mounting mechanisms within the stage which serve for the attachment of the robot manipulator, and after the detachment, such mounting mechanisms are either removed or stowed at the stage level.

Figure 1:
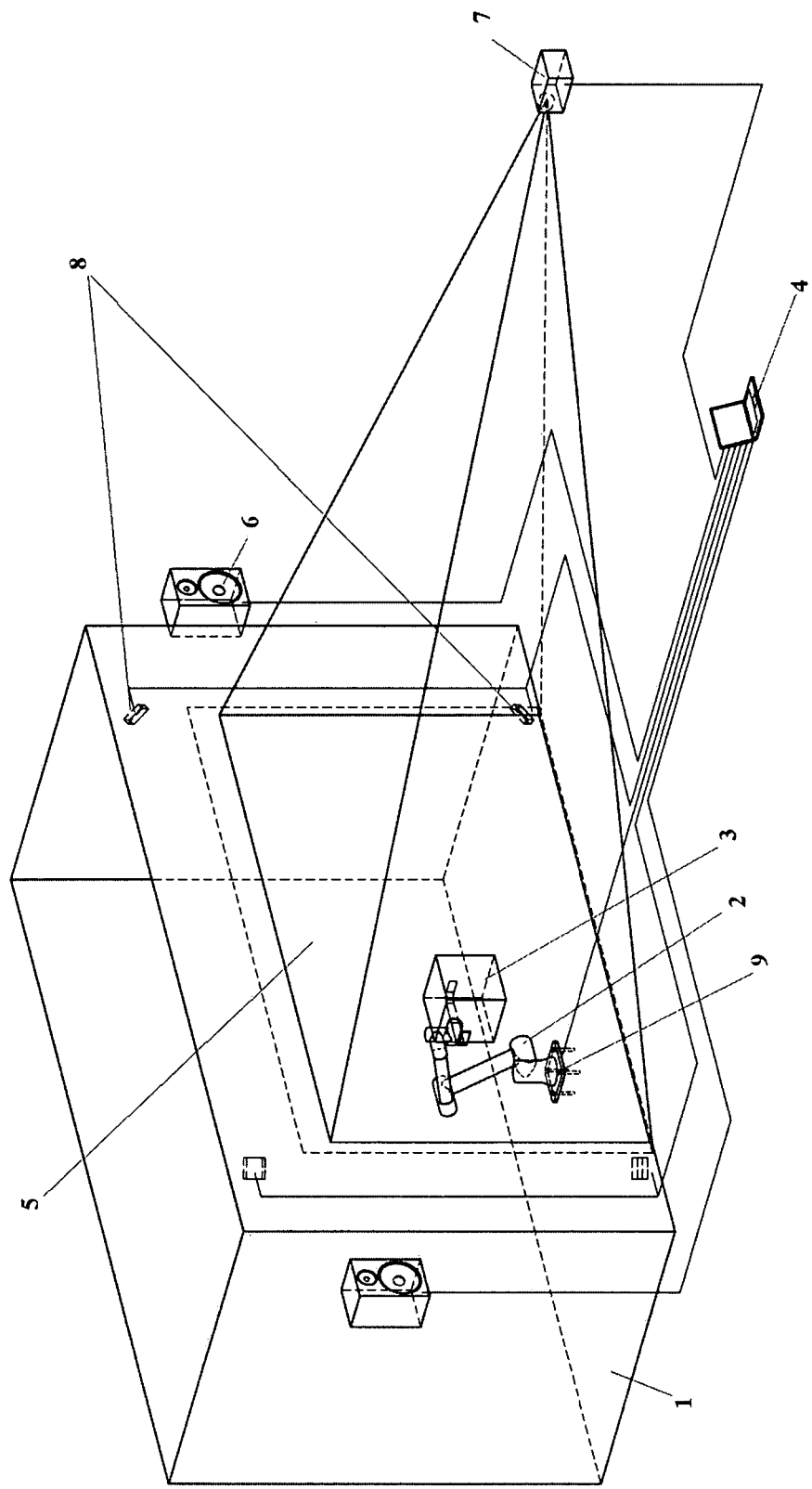
FIG. 1 shows the system with the stationary installation of the robot manipulator on the stage.

As shown in FIG. 1, the robot manipulator has a base in its lower part, which is stationary installed on the stage by fastening means. Such fastening means are screws or pins, reinforcing bar segments, etc. with diameter from 10 mm. The fastening means penetrate the stage structure (which is preferably made from a concrete-based or stone-based solution). It allows for the stationary installation of the robot manipulator.

Figure 2:
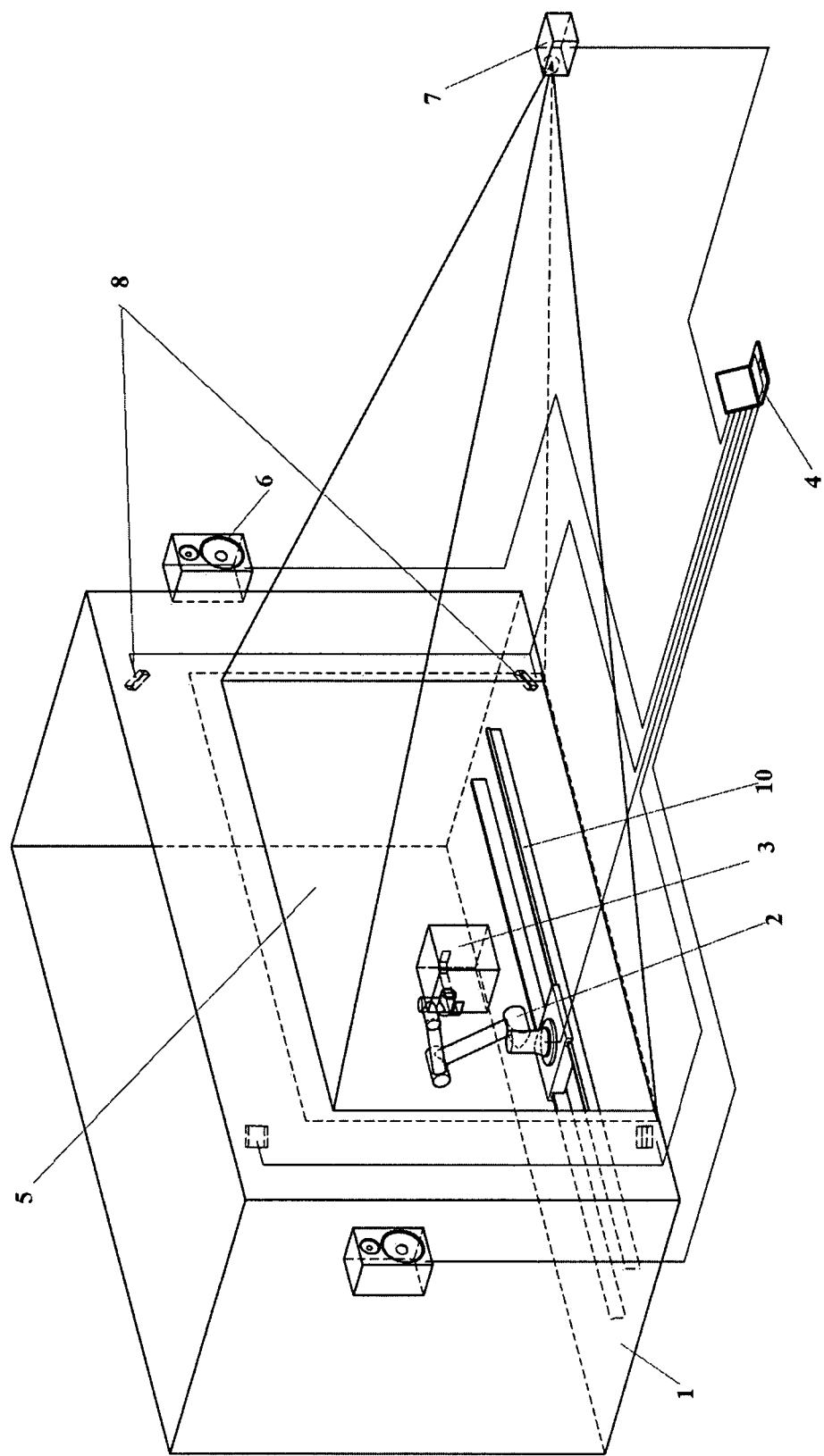
FIG. 2 shows the system containing the rails on which the robot manipulator is installed.

As shown in FIG. 2, the robot manipulator has a base that is mounted on the rails. It is preferred to install the rails sturdily with the possibility of dismantlement. The base is preferably driven by a propelling unit controlled by the robot manipulator.

Figure 3:
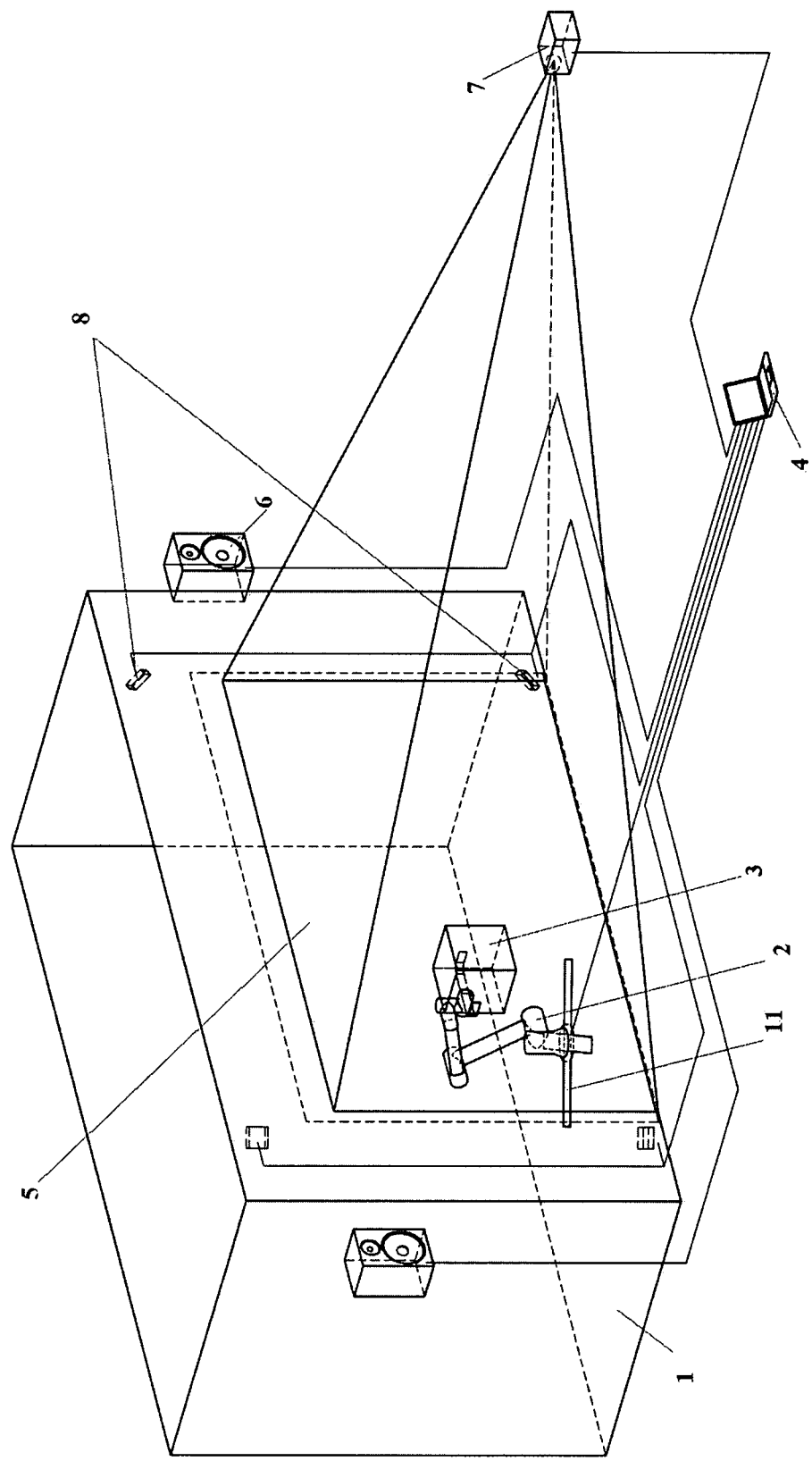
FIG. 3 shows the system where the robot manipulator is mounted on the support.

As shown in FIG. 3, the robot manipulator can be mounted onto the stage. In this embodiment, the definitions "stationary installed" and "mounted" should be distinguished. In the first case, it should be understood as an unremovable installation where the base of the robot manipulator and stage are fully integrated. In the case of "mounted" installation, the base is installed on the support ensuring the stability of the robot manipulator. In this case, the robot manipulator can be dismantled without deforming the base or support and without damaging the stage.

The robot manipulator has preferably been made based on the development disclosed at https://www.kuka.com/-/media/kuka-downloads/imported/48ec812b1b2947898ac2598aff70abc0/spez_kr_quantec_ultra_en.pdf, the contents of which are appended hereto for reference. The robot manipulator was used in the industry, in particular, for positioning the product on a conveyor. According to the claimed solution, it is used for a new purpose—synchronizing the position and/or movement of a person or object with the projected image and/or sound accompaniment on the stage. The robot manipulator has a base for the on-stage installation. Moreover, the base can be installed on the stage both in a stationary way and with the capability of moving around the stage. The movement on the stage can be achieved by using rails on which the robot manipulator is installed. The movements are controlled via the control unit. The structural elements of the robot manipulator also comprise at least one arm, which includes several pivotally connected elements. In this way, the arm can perform movements in six axes within the accuracy up to 0.01 mm. The arm rotation range is ±450° in a single plane, and the speed of rotation is from 0 to 2000°/sec. The arm has a maximum elongation of 6200 mm, allowing for the unobstructed movement of large objects behind the mesh screen. An object or a person is attached to the harness, which is coupled to the robot manipulator's arm via the flange. The harness is configured to fix the object within the harness allowing for the enhancement of functionalities of the claimed system by increasing the number of possible positions of the object or person behind the mesh screen. The maximum weight that can be held by the harness is 3200 kg. The robot manipulator is covered with a fabric cover or paint that absorbs visible and ultraviolet radiation and is therefore invisible to spectators during a performance or event. The cover can be solid or composite, i.e. composed of several overlapping parts. It is preferred to use elastic fabric in the areas of the pivot connection of the arm's elements. It ensures the creation of the effect of autonomous movement of an object/person behind the mesh screen relative to the reproduced graphic image.

More than one robot manipulator can be placed on the stage. In doing so, it is necessary to adhere to the condition that the positioning of the harness for the arm of each robot manipulator, as well as the intersection of the trajectories of the movement of arms at the same point of space at the same time, is inadmissible. Besides, the dimensions of the positioned objects should be taken into consideration during the programming of the movements.

The projection mesh screen is placed along the stage dividing it into the front part that is closer to the spectators and rear part that is separated from the spectators by the projection mesh screen. The projection mesh screen is a flat or curved surface made from fabric or film or similar material having a cellular structure that is configured to hold some portion of the luminous flux. In doing so, the structure of the material ensures the visibility of the object at a sufficient level of light transmitted by the projector. It is possible to place the mesh screen from several canvases, which are at least partially overlapping. The projection of the mesh screen on the stage can be either a straight line or broken line or curved line.

Besides, the robot manipulator comprises the controller configured to carry out reprogramming as well as save and reproduce the control commands to change the arm position in space. The robot manipulator is connected to the control unit to ensure synchronization and remote control.

The projection device is configured to project the luminous flux on the projection mesh screen. The projection device is connected to the control unit for the luminous flux output alteration synchronization. The luminous flux alteration shall mean the algorithm on the time-based determination of the direction, intensity, and color of the luminous flux emitted by the projection device. Besides, the lighting device is configured to rotate at a certain angle to adjust the lighting of the onstage object or the stage itself.

The control unit is a programmable device with the possibility of reprogramming. Its functions include the ability to transmit the control signals to alter the luminous flux emitted by the projection device in accordance to the movements of the robot manipulator and setting the mode of operation of the controlled stage lighting equipment.

In addition, the acoustic system is connected to the control unit for the audio program playback synchronization with the luminous flux output and the robot manipulator's movements.

Thus, it is shown that the required technical result declared by the applicant is actually achieved.

What is claimed is:

1. A system for co-positioning physical and virtual objects during the stage performances comprising
    a stage,
    a projection mesh screen,
    a projection device,
    wherein the system further comprises
    a control unit,
    a robot manipulator having a base and at least one arm divided into sections where the sections are pivotally connected with each other, wherein the robot manipulator is coupled to the control unit and is configured to make the arm movements in six axes within an accuracy of up to 0.01 mm, rotation range±450° in a single plane and at a speed from 0 to 2000°/sec.,
    a harness attached to the robot manipulator's arm,
    a controlled stage lighting device connected to the control unit,
    wherein the projection mesh screen is located along the stage and configured to divide the stage into a front part which is closer to spectators and a rear part which is separated from the spectators by the projection mesh screen,
    where the projection mesh screen is made of a material partially reflecting a luminous flux projected onto it,
    the projection device is coupled to the control unit and configured to project the luminous flux onto the projection mesh screen,
    wherein the control unit is configured to transmit control signals for a synchronization of a luminous flux change through the projection device with the movements of the harness.

2. The system according to claim 1, wherein the robot manipulator is configured to be installed in a stationary way onto the stage by mounting the base on the stage.

3. The system according to claim 1, wherein the robot manipulator is configured to move on the stage through an installation of its base on rails.

4. The system according to claim 1, wherein the robot manipulator is configured to be mounted on the stage through an installation of the base on a support.

5. The system according to claim 1, wherein the system comprises an acoustic system connected to the control unit.

6. The system according to claim 1, wherein the control unit is configured to set a mode of operation of a controlled stage lighting device of UV band and visible light.

* * * * *